United States Patent
Arashi et al.

(10) Patent No.: US 8,796,889 B2
(45) Date of Patent: Aug. 5, 2014

(54) IN-VEHICLE INTEGRATED-INVERTER ELECTRIC COMPRESSOR

(75) Inventors: Noriaki Arashi, Aichi (JP); Manabu Suzuki, Aichi (JP); Takeshi Hirano, Aichi (JP); Minoru Kawada, Aichi (JP); Takayuki Watanabe, Aichi (JP); Ichiro Yogo, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 760 days.

(21) Appl. No.: 13/058,450

(22) PCT Filed: Nov. 13, 2009

(86) PCT No.: PCT/JP2009/069325
§ 371 (c)(1),
(2), (4) Date: Feb. 10, 2011

(87) PCT Pub. No.: WO2010/073847
PCT Pub. Date: Jul. 1, 2010

(65) Prior Publication Data
US 2011/0133575 A1    Jun. 9, 2011

(30) Foreign Application Priority Data

Dec. 26, 2008    (JP) .................................. 2008-335057

(51) Int. Cl.
*H02H 11/00*    (2006.01)

(52) U.S. Cl.
USPC ........................................................ 307/326

(58) Field of Classification Search
USPC ........................................................ 307/326
See application file for complete search history.

(56) References Cited

U.S. PATENT DOCUMENTS

2006/0230781 A1*  10/2006  Kawada et al. .................. 62/498
2007/0115707 A1*   5/2007  Koide ........................... 363/146

FOREIGN PATENT DOCUMENTS

| JP | 2006-322444 A |   | 11/2006 |
| JP | 2007-113486 A |   | 5/2007 |
| JP | 2007-315270   | * | 12/2007 |
| JP | 2007-315270 A |   | 12/2007 |

OTHER PUBLICATIONS

Japanese Decision to Grant a Patent, issued May 28, 2013 in corresponding Japanese Patent Application No. 2008-335057; w/partial English translation (4 pages).
International Search Report of PCT/JP2009/069325, date of mailing Dec. 22, 2009.

* cited by examiner

*Primary Examiner* — Jared Fureman
*Assistant Examiner* — Duc M Pham
(74) *Attorney, Agent, or Firm* — Westerman, Hattori, Daniels & Adrian, LLP

(57) ABSTRACT

Disclosed is an in-vehicle integrated-inverter electric compressor (1) in which an inverter accommodating section (3) is provided on the periphery of a housing (2), an inverter device is installed in the inverter accommodating section (3), and the opening portion of the inverter accommodating section (3) is sealed by means of a cover member (4) to be fixed with screws. A safety mechanism (7) is provided such that some of the fixing screws (5) fixing the cover member (4) to the inverter accommodating section (3) cannot be removed when the electric compressor (1) is mounted in a vehicle.

8 Claims, 3 Drawing Sheets

IN-VEHICLE INTEGRATED-INVERTER ELECTRIC COMPRESSOR

TECHNICAL FIELD

The present invention relates to an in-vehicle integrated-inverter electric compressor in which an inverter device is integrated and that is preferably used as a compressor for an air-conditioning unit to be mounted in an electric car, a hybrid car, or the like.

BACKGROUND ART

An electric compressor in which an inverter device is integrated is used as a compressor of an air-conditioning unit to be mounted in an electric car, a hybrid car, or the like. In this integrated-inverter electric compressor, an inverter accommodating section is provided on the periphery of a housing that contains a compressor mechanism and an electric motor for driving the compressor mechanism, and the inverter device that converts high-voltage DC power supplied from a power supply unit into three-phase AC power and that supplies the three-phase AC power to the electric motor is installed in the inverter accommodating section. The inverter accommodating section is sealed by means of a cover member.

In general, the electric compressor used for a vehicle air-conditioning unit is mounted in the engine compartment of a vehicle. However, in the vehicle-mounted state, when the electric compressor is mounted at a position where access to the cover member, which seals the inverter accommodating section, is allowed, the cover member can be removed even if a safety measure is not taken, such as disconnecting a connector of a power supply cable connected to a high-voltage power source. Therefore, there is a risk of accidentally coming into contact with a high voltage when the cover member is removed while the high voltage is being applied to the inverter device.

Thus, a technology for ensuring safety when the cover member is removed has been proposed, in which an interlock mechanism is provided that automatically cuts off the high voltage supplied to the inverter device by removing a separate protective cover or an interlock plate provided on the upper surface of the cover member when a worker removes the cover member, sealing the inverter accommodating section, at the time of maintenance of the inverter device (for example, see PLT 1 and PLT 2).

CITATION LIST

Patent Literature

{PTL 1}
Japanese Unexamined Patent Application, Publication No. 2006-322444
{PTL 2}
Japanese Unexamined Patent Application, Publication No. 2007-113486

SUMMARY OF INVENTION

Technical Problem

However, as the structure of a safety mechanism for avoiding the risk of coming into contact with the inverter device to which high voltage is applied when the cover member on the inverter accommodating section is removed, in addition to the protective cover or the interlock plate that is detachably attached on the upper surface of the cover member by screws, the interlock mechanism disclosed in PLT 1 and PLT 2 needs to be provided with a current controller for an interlock switch mechanism or the like that is operated when the protective cover or the interlock plate is attached or detached. Therefore, there are problems in that the structure of the inverter device becomes complicated, space for installing the interlock mechanism needs to be ensured, and an increase in cost is unavoidable.

The present invention has been made in view of these circumstances, and an object thereof is to provide an in-vehicle integrated-inverter electric compressor capable of reliably avoiding the risk of coming into contact with the inverter device to which a high voltage is applied, by using a simply-structured safety mechanism.

Solution to Problem

In order to solve the above-described problems, the in-vehicle integrated-inverter electric compressor of the present invention employs the following solutions.

Specifically, there is provided an in-vehicle integrated-inverter electric compressor in which an inverter accommodating section is provided on a periphery of a housing, an inverter device is installed in the inverter accommodating section, and an opening portion of the inverter accommodating section is sealed by means of a cover member to be fixed with screws, the in-vehicle integrated-inverter electric compressor including a safety mechanism with which some of the fixing screws fixing the cover member to the inverter accommodating section cannot be removed when the electric compressor is mounted in a vehicle.

According to the present invention, the safety mechanism is provided such that some of the fixing screws fixing the cover member to the inverter accommodating section cannot be removed when the electric compressor, in which the opening portion of the inverter accommodating section is sealed by means of the cover member, is mounted in the vehicle; therefore, the cover member on the inverter accommodating section cannot be removed while the electric compressor remains mounted in the vehicle, and, in order to remove the cover member, it is necessary to take out the electric compressor from the vehicle. As a result, in order to remove the cover member, the electric compressor needs to be taken out from the vehicle after the connector of the power supply cable is disconnected, which cuts off the high voltage. Therefore, the risk of coming into contact with the high voltage when the cover member is removed while the high voltage is being applied to the inverter device can be avoided. Further, in order to avoid the risk, because it is not necessary to provide a safety mechanism that uses a complicated expensive interlock mechanism or expensive special screws, it is possible to realize a simplified structure of the safety mechanism, a reduction in installation space, and a reduction in cost.

Further, in the above-described in-vehicle integrated-inverter electric compressor, it is preferable that the safety mechanism make it impossible to remove at least two of the fixing screws.

With this structure, the safety mechanism makes it impossible to remove at least two of the fixing screws; thus, even if the rest of the fixing screws, other than the two screws, are all removed, it is difficult to rotate the cover member, and the inverter accommodating section cannot be opened. Therefore, the risk of coming into contact with the inverter device to which a high voltage is being applied can be reliably avoided.

Further, in any of the above-described in-vehicle integrated-inverter electric compressors, it is preferable that the safety mechanism include: a safety cover that covers some of the fixing screws; and fixing screws that fix the safety cover to the housing including the inverter accommodating section, on a surface facing a mounting area in the vehicle-mounted state.

With this structure, the safety mechanism is constructed with: the safety cover that covers some of the fixing screws; and the fixing screws that fix the safety cover to the housing including the inverter accommodating section, on the surface facing the mounting area in the vehicle-mounted state. Thus, the safety mechanism can be simply constructed merely with the safety cover covering some of the fixing screws and the fixing screws fixing the safety cover. Furthermore, since the fixing screws fixing the safety cover are positioned facing the mounting area side in the vehicle-mounted state and cannot be removed, the fixing screws for the cover member cannot be removed in the vehicle-mounted state, either. Therefore, it is possible to avoid a risk that may arise when the cover member is removed while the high voltage is being applied and to realize a simplified structure, a reduction in space, and a reduction in cost, compared with a conventional safety mechanism using an interlock mechanism or special screws.

Further, in any of the above-described in-vehicle integrated-inverter electric compressors, it is preferable that the safety mechanism include: a bent portion that is formed by bending and extending part of the cover member toward a surface facing a mounting area in the vehicle-mounted state; and screws that fix the bent portion to the housing including the inverter accommodating section, on a surface facing a mounting area in the vehicle-mounted state.

With this structure, the safety mechanism is constructed with: the bent portion that is formed by bending and extending part of the cover member toward the surface facing the mounting area in the vehicle-mounted state; and the screws that fix the bent portion to the housing including the inverter accommodating section, on the surface facing the mounting area in the vehicle-mounted state. Thus, the safety mechanism can be simply constructed merely with the bent portion formed by bending and extending part of the cover member and the screws fixing the bent portion to the housing side. Furthermore, since the screws fixing the bent portion to the housing side are positioned facing the mounting area side in the vehicle-mounted state and cannot be removed, the cover member cannot be removed in the vehicle-mounted state, either. Therefore, it is possible to avoid a risk that may arise when the cover member is removed while the high voltage is being applied and to realize a simplified structure, a reduction in space, and a reduction in cost, compared with a conventional safety mechanism using an interlock mechanism or special screws.

Further, in any of the above-described in-vehicle integrated-inverter electric compressors, it is preferable that the safety mechanism include a cover portion that is provided on a bracket for mounting the electric compressor on a mounting area in the vehicle-mounted state and that covers some of the fixing screws in the vehicle-mounted state.

With this structure, the safety mechanism is constructed with the cover portion that is provided on the bracket for mounting the electric compressor on the mounting area in the vehicle-mounted state and that covers some of the fixing screws in the vehicle-mounted state. Thus, the safety mechanism can be simply constructed by providing the cover portion covering some of the fixing screws, on the existing compressor-mounting bracket. Furthermore, in the vehicle-mounted state, some of the fixing screws fixing the cover member are covered by the cover portion provided on the bracket and cannot be removed. Therefore, it is possible to avoid a risk that may arise when the cover member is removed while the high voltage is being applied and to realize a simplified structure, a reduction in space, and a reduction in cost, compared with a conventional safety mechanism using an interlock mechanism or special screws.

Advantageous Effects of Invention

According to the present invention, the cover member on the inverter accommodating section cannot be removed while the electric compressor is mounted in the vehicle, and, in order to remove the cover member, the electric compressor needs to be taken out from the vehicle. As a result, in order to remove the cover member, the electric compressor needs to be taken out from the vehicle after the connector of the power supply cable is disconnected, which cuts off the high voltage. Thus, a risk of coming into contact with the high voltage when the cover member is removed while the high voltage is being applied to the inverter device can be avoided. Furthermore, in order to avoid the risk, because it is not necessary to provide a safety mechanism that uses a complicated expensive interlock mechanism or expensive special screws, it is possible to realize a safety mechanism with a simplified structure, a reduction in installation space, and a reduction in cost.

DESCRIPTION OF EMBODIMENTS

Embodiments of the present invention will be described below with reference to the drawings.

First Embodiment

A first embodiment of the present invention will be described below using FIGS. 1 and 2.

Figure 1:
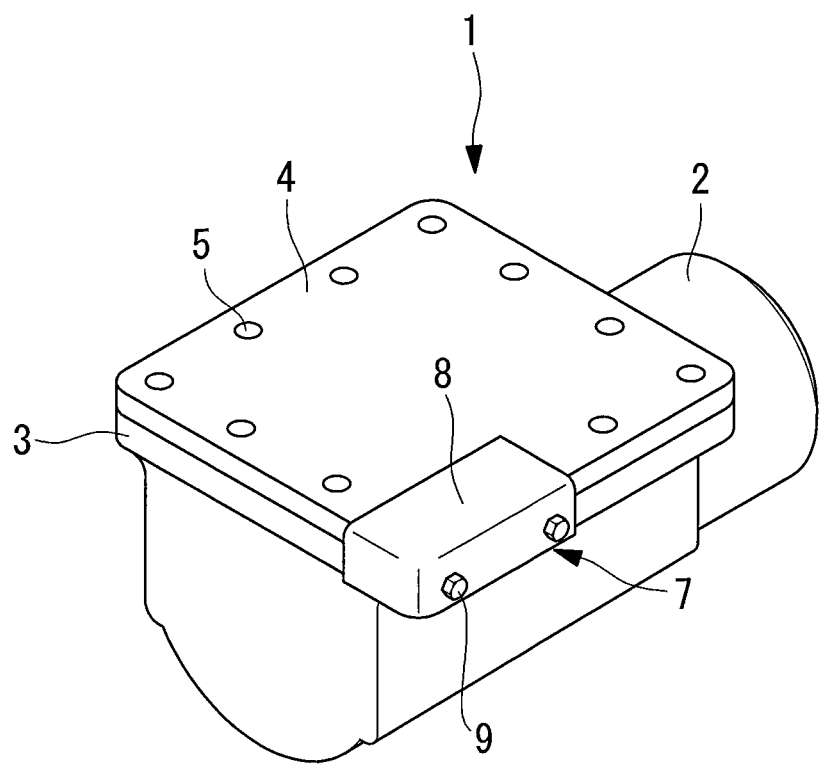
FIG. 1 is a perspective view showing the appearance of an in-vehicle integrated-inverter electric compressor according to a first embodiment of the present invention.
Figure 2:
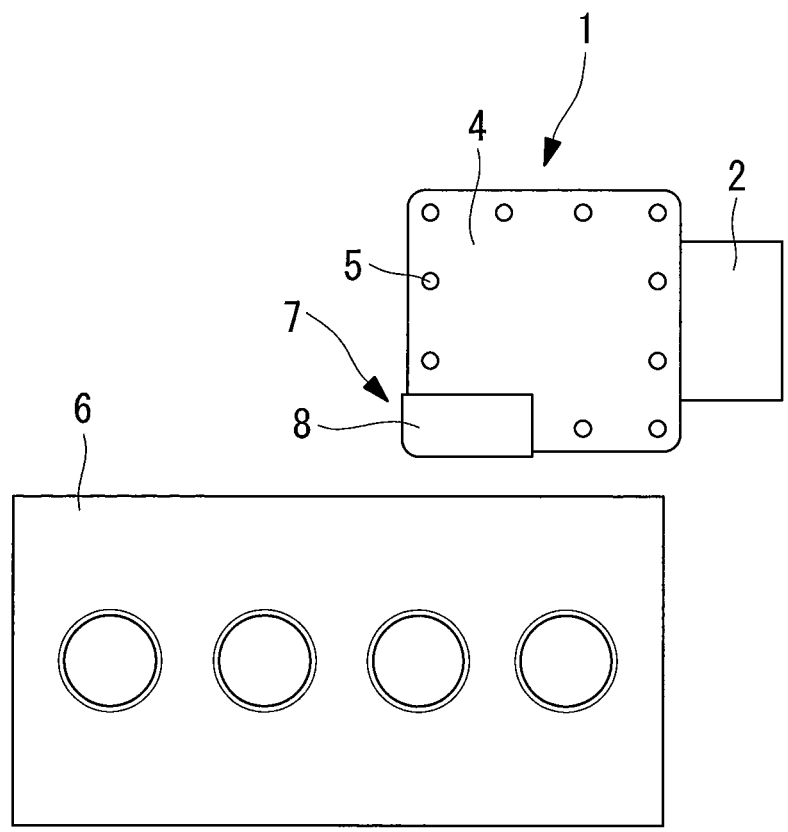
FIG. 2 is a plan view of the in-vehicle integrated-inverter electric compressor shown in FIG. 1 when it is mounted in the vehicle.

FIG. 1 is a perspective view showing the appearance of an in-vehicle integrated-inverter electric compressor according to the first embodiment of the present invention; and FIG. 2 is a plan view thereof when it is mounted in the vehicle.

An in-vehicle integrated-inverter electric compressor 1 has a housing 2 that contains an electric motor (not shown) and a compressor mechanism driven by the electric motor. The housing 2 may be structured by integrally combining an aluminum die-cast motor housing and compressor housing.

An inverter accommodating section 3 is integrally formed on the periphery of the housing 2 at a side where the electric motor is contained. The inverter accommodating section 3 has a box shape whose upper surface is opened, and an inverter device (not shown) is installed therein. The inverter device converts high-voltage DC power supplied from an in-vehicle power supply unit into three-phase AC power and supplies it to the electric motor. The inverter device may be a known inverter device that includes high-voltage parts, such as a smoothing condenser and a common-mode coil; a power board on which a switching circuit formed of a plurality of semiconductor switching elements, such as an IGBT, is mounted; and a CPU board on which a control and communication circuit formed of elements operated at low voltage, such as a CPU, is mounted.

The above-described inverter device requires insulation, water proofing, vibration proofing, cooling, etc., and, after being subjected to the corresponding treatments, is installed in the inverter accommodating section 3. The upper-surface opening portion of the inverter accommodating section 3 is sealed by means of a cover member 4 that is tightly fixed by a plurality of fixing screws 5, thus providing a waterproof structure.

For example, in a hybrid car, the in-vehicle integrated-inverter electric compressor 1 is mounted on a side wall of an engine main body (mounting area) 6 via a compressor-mounting bracket 12 (see FIG. 4) in a cantilevered manner in an engine compartment. FIG. 2 is a plan view showing a state where the in-vehicle integrated-inverter electric compressor 1 is mounted on the side wall of the engine main body 6 via the bracket 12. High-voltage DC power is supplied to the integrated-inverter electric compressor 1 from the power supply unit, which is mounted in the vehicle for the inverter device, via a power supply cable. Therefore, at the time of maintenance etc., if the cover member 4 on the inverter accommodating section 3 is removed while a connector of the power supply cable is still connected, a risk of coming into contact with the high voltage arises.

In this embodiment, as shown in FIG. 1, as a safety mechanism 7 for avoiding this risk, a safety cover 8 is provided that covers at least two of the plurality of fixing screws 5, which tightly fix the cover member 4 on the inverter accommodating section 3. Then, the safety cover 8 is fixed by screws 9 to the housing 2 including the inverter accommodating section 3, on a side surface facing the side wall of the engine main body 6, which is the mounting area for the integrated-inverter electric compressor 1 in the vehicle-mounted state.

With the structure described above, according to this embodiment, the following advantageous effects are afforded.

Figure 4:
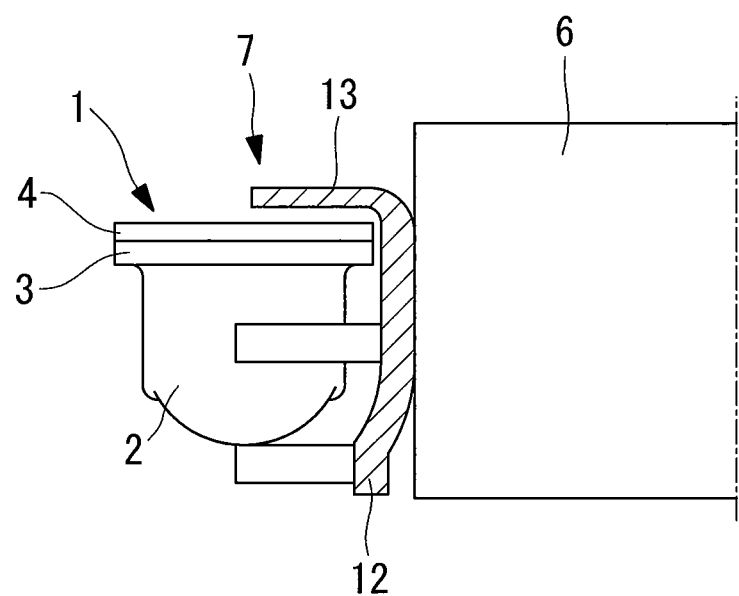
FIG. 4 is a rear view of an in-vehicle integrated-inverter electric compressor according to a third embodiment of the present invention when it is mounted in the vehicle.

FIG. 2 is a plan view showing a state where the integrated-inverter electric compressor 1 is mounted on the side wall of the engine main body 6 via the compressor-mounting bracket 12 (see FIG. 4). In this state, the integrated-inverter electric compressor 1 is connected to the in-vehicle power supply unit via the power supply cable and is driven by power supplied from the power supply unit to the inverter device installed in the inverter accommodating section 3. The power is high-voltage DC power, is converted by the inverter device into three-phase AC power having a frequency specified by a control device (not shown), and is supplied to the electric motor contained in the housing 2.

At the time of maintenance of the inverter device, it is necessary to remove the cover member 4, which seals the inverter accommodating section 3. However, if the cover member 4 is removed while a safety measure is not taken, such as disconnecting the connector of the power supply cable, there is a risk of accidentally coming into contact with the high voltage. In order to avoid this risk, the safety mechanism 7 is provided such that the cover member 4 cannot be removed when the integrated-inverter electric compressor 1 remains in the vehicle-mounted state. In the safety mechanism 7, the safety cover 8 covers at least two of the plurality of fixing screws 5, which fix the cover member 4, and the screws 9 fixing the safety cover 8 to the housing 2 side are disposed on the side surface facing the side wall of the engine main body 6 in the vehicle-mounted state, thereby making it impossible to remove the cover member 4 in the vehicle-mounted state.

Thus, in order to remove the cover member 4 on the inverter accommodating section 3, the integrated-inverter electric compressor 1 needs to be taken out from the vehicle. As a result, in order to remove the cover member 4, the integrated-inverter electric compressor 1 needs to be taken out from the vehicle after the connector of the power supply cable is disconnected, which cuts off the high voltage. Therefore, the risk of coming into contact with the high voltage when the cover member 4 is removed while the high voltage is being applied to the inverter device can be avoided.

Furthermore, in order to avoid the above-described risk, it is not necessary to provide a safety mechanism that uses a complicated expensive interlock mechanism or expensive special screws, unlike conventional technologies. This realizes a simplified structure of the safety mechanism 7, a reduction in installation space, and a reduction in cost. Furthermore, since at least two of the plurality of fixing screws 5 are covered by the safety cover 8 to make it impossible to remove the cover member 4 in the vehicle-mounted state, even if the rest of the fixing screws 5, other than the two screws, are all removed, it is difficult to rotate the cover member 4, and the inverter accommodating section 3 cannot be opened. Therefore, the risk of coming into contact with the inverter device to which a high voltage is being applied can be reliably avoided.

In addition, the safety mechanism 7, which makes it impossible to remove the cover member 4 in the vehicle-mounted state, is constructed merely with the safety cover 8, which covers at least two of the fixing screws 5, and the screws 9, which fix the safety cover 8 to the housing 2 including the inverter accommodating section 3 on the surface facing the side wall of the engine main body 6, which is the mounting area in the vehicle-mounted state; thus, the safety mechanism 7 can be made into a very simple structure. Therefore, compared with a conventional safety mechanism using an interlock mechanism or special screws, it is possible to realize a simplified structure, a reduction in installation space, and a reduction in cost.

Second Embodiment

Next, a second embodiment of the present invention will be described using FIG. 3.

This embodiment differs from the above-described first embodiment in that, instead of additionally providing the safety cover 8, the shape of the cover member 4 is modified to serve as the safety mechanism 7. Since the other parts are the same as those of the first embodiment, a description thereof will be omitted.

Figure 3:
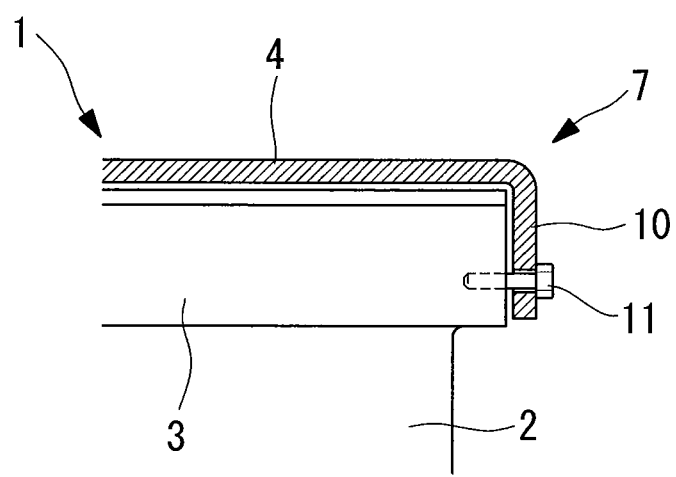
FIG. 3 is a side view of an in-vehicle integrated-inverter electric compressor according to a second embodiment of the present invention.

In this embodiment, as shown in FIG. 3, the safety mechanism 7 has a structure in which part of the cover member 4 is bent and extended toward the side surface facing the side wall of the engine main body 6, which is the mounting area in the vehicle-mounted state, to form a bent portion 10, and the bent portion 10 is fixed by two fixing screws 11 to the inverter accommodating section 3 or the housing 2 on the surface facing the side wall of the engine main body 6.

With the above-described structure, the safety mechanism 7, which makes it impossible to remove the cover member 4 in the vehicle-mounted state, can be constructed merely with the bent portion 10, formed by bending and extending part of the cover member 4, and the fixing screws 11, fixing the bent portion 10 to the housing 2 side. Furthermore, the fixing screws 11, fixing the bent portion 10 to the housing 2 side, are positioned facing the side wall of the engine main body 6, which is the mounting area in the vehicle-mounted state, and cannot be removed; thus, the cover member 4 cannot be removed in the vehicle-mounted state, either. Therefore, as in the first embodiment, in this embodiment, it is possible to avoid a risk that may arise when the cover member 4 is removed while a high voltage is being applied, and to realize a simplified structure, a reduction in installation space, and a reduction in cost, compared with a conventional safety mechanism using an interlock mechanism or special screws.

Third Embodiment

Next, a third embodiment of the present invention will be described using FIG. 4.

This embodiment differs from the above-described first embodiment in that a cover portion 13 that serves as the safety mechanism 7 and that makes it impossible to remove the fixing screws 5 for the cover member 4 is provided on the compressor-mounting bracket 12. Since the other parts are the same as those of the first embodiment, a description thereof will be omitted.

In this embodiment, as shown in FIG. 4, the safety mechanism 7 has a structure in which, on the compressor-mounting bracket 12, which mounts the integrated-inverter electric compressor 1 on the side wall of the engine main body 6, the cover portion 13 is integrally formed by horizontally extending part of the upper end of the compressor-mounting bracket 12 so as to cover, in the vehicle-mounted state, at least two of the fixing screws 5 used for the cover member 4.

In this embodiment, as shown in FIG. 4, the safety mechanism 7 has a structure in which, on the compressor-mounting bracket 12, which mounts the integrated-inverter electric compressor 1 on the side wall of the engine main body 6, the cover portion 13 is integrally formed by horizontally extending part of the upper end of the compressor-mounting bracket 12 so as to cover, in the vehicle-mounted state, at least two of the fixing screws 5 used for the cover member 4.

With the above-described structure, the safety mechanism 7, which makes it impossible to remove the cover member 4 in the vehicle-mounted state, can be simply made by integrally forming the cover portion 13, which covers at least two of the fixing screws 5, with use of the existing compressor-mounting bracket 12. Furthermore, some of the fixing screws 5 fixing the cover member 4 are covered, in the vehicle-mounted state, by the cover portion 13 provided on the bracket 12 and cannot be removed. Therefore, as in the first embodiment, in this embodiment, it is possible to avoid a risk that may arise when the cover member 4 is removed while a high voltage is being applied and to realize a simplified structure, a reduction in installation space, and a reduction in cost, compared with a conventional safety mechanism using an interlock mechanism or special screws.

The present invention is not limited to the inventions according to the above-described embodiments, and appropriate changes can be made without departing from the scope thereof. For example, in the above-described embodiments, a description has been given of an example where the inverter accommodating section 3 is integrally formed on the housing 2. However, it is not necessarily integrally formed thereon; but a separately-formed member may be integrally attached thereto. Furthermore, the safety cover 8, the bent portion 10, and the cover portion 13 may be disposed at any positions along the longitudinal direction of the inverter accommodating section 3.

Furthermore, in each of the above-described embodiments, at least two of the fixing screws 5 are covered by the safety cover 8 or the cover portion 13, and the two fixing screws 11 are used to fix the bent portion 10; however, the number of fixing screws 5 to be covered by the safety cover 8 or the cover portion 13 or the number of fixing screws 11 to be used to fix the bent portion 10 may be one or three or more, and, as a matter of course, the present invention encompasses these cases.

REFERENCE SIGNS LIST

1 in-vehicle integrated-inverter electric compressor
2 housing
3 inverter accommodating section
4 cover member
5 fixing screws
6 engine main body (mounting area)
7 safety mechanism
8 safety cover
9 screws
10 bent portion
11 fixing screws
12 compressor-mounting bracket
13 cover portion

The invention claimed is:

1. An in-vehicle integrated-inverter electric compressor, comprising:
   an inverter accommodating section provided on a periphery of a housing;
   an inverter device installed in the inverter accommodating section;
   an opening portion of the inverter accommodating section sealed by means of a cover member to be fixed with screws; and
   a safety mechanism with which some of the fixing screws fixing the cover member to the inverter accommodating section:
   wherein providing the safety mechanism so as to face a mounting area prevents the cover member from being removed when the electric compressor is mounted in a vehicle.

2. An in-vehicle integrated-inverter electric compressor according to claim 1, wherein the safety mechanism makes it impossible to remove at least two of the fixing screws.

3. An in-vehicle integrated-inverter electric compressor according to claim 2, wherein the safety mechanism comprises:
   a safety cover that covers some of the fixing screws; and
   fixing screws that fix the safety cover to the housing including the inverter accommodating section, on a surface facing a mounting area in the vehicle-mounted state.

4. An in-vehicle integrated-inverter electric compressor according to claim 2, wherein the safety mechanism comprises:
   a bent portion that is formed by bending and extending part of the cover member toward a surface facing a mounting area in the vehicle-mounted state; and
   screws that fix the bent portion to the housing including the inverter accommodating section, on a surface facing a mounting area in the vehicle-mounted state.

5. An in-vehicle integrated-inverter electric compressor according to claim 2, wherein the safety mechanism comprises a cover portion that is provided on a bracket for mounting the electric compressor on a mounting area in the vehicle-mounted state and that covers some of the fixing screws in the vehicle-mounted state.

6. An in-vehicle integrated-inverter electric compressor according to claim 1, wherein the safety mechanism comprises:
- a safety cover that covers some of the fixing screws; and
- fixing screws that fix the safety cover to the housing including the inverter accommodating section, on a surface facing a mounting area in the vehicle-mounted state.

7. An in-vehicle integrated-inverter electric compressor according to claim 1, wherein the safety mechanism comprises:
- a bent portion formed by bending and extending part of the cover member toward a surface facing a mounting area in the vehicle-mounted state; and
- screws that fix the bent portion to the housing including the inverter accommodating section, on a surface facing a mounting area in the vehicle-mounted state.

8. An in-vehicle integrated-inverter electric compressor according to claim 1, wherein the safety mechanism comprises:
- a cover portion that is provided on a bracket for mounting the electric compressor on a mounting area in the vehicle-mounted state and that covers some of the fixing screws in the vehicle-mounted state.

* * * * *